United States Patent [19]
Padgitt

[11] B 3,921,048
[45] Nov. 18, 1975

[54] SOLID STATE CONTROL FOR HOSPITAL BED MOTORS

[75] Inventor: Kenneth W. Padgitt, Arlington Heights, Ill.

[73] Assignee: Borg-Warner Corporation, Chicago, Ill.

[22] Filed: July 18, 1973

[21] Appl. No.: 380,310

[44] Published under the Trial Voluntary Protest Program on January 28, 1975 as document no. B 380,310.

Related U.S. Application Data

[63] Continuation of Ser. No. 187,725, Oct. 8, 1971, abandoned.

[52] U.S. Cl............................ 318/480; 250/229
[51] Int. Cl.[2].......................................... H02P 7/74
[58] Field of Search........... 318/480, 207 R; 250/229

[56] References Cited
UNITED STATES PATENTS

| | | | |
|---|---|---|---|
| 3,094,713 | 6/1963 | Wise | 5/67 |
| 3,309,587 | 3/1967 | Meng | 318/480 X |
| 3,336,482 | 8/1967 | Mierendorf et al. | 250/229 |
| 3,465,373 | 9/1969 | Wilson | 5/68 |
| 3,528,103 | 9/1970 | Wolf | 318/207 R |
| 3,588,512 | 6/1971 | Hollien | 250/229 X |
| 3,641,413 | 2/1972 | Ohntrup | 318/480 |
| 3,697,846 | 10/1972 | Mueller | 318/547 X |
| 3,728,606 | 4/1973 | Finnegan | 318/480 |

*Primary Examiner*—B. Dobeck
*Attorney, Agent, or Firm*—James E. Tracy

[57] ABSTRACT

A control system and circuitry in an electric motor articulated hospital bed for achieving electrical isolation between the patient's hand control unit and the higher current motor circuitry and for protecting him against shock is disclosed wherein an optical linkage is employed using photosensitive elements (photoresistors) and low voltage lamps. For each controlled function (e.g. knee up or down) lighting of the lamps changes the resistance of the photoresistor to cause a solid state circuit to turn on one, but never both, of a pair of Triacs each of which is in series with a different directional coil (clockwise or counterclockwise) of a motor and the electric mains (e.g. 120v, 60 hz. a.c.). Two or more motors may be controlled from a single electrically isolated hand held unit. In one embodiment, a low voltage transformer output is switched by the patient, in another embodiment a small d.c. battery is so switched and in a third embodiment the patient controls a mechanical linkage to mask or unmask remotely located photoresistor from a light source.

1 Claim, 5 Drawing Figures

Inventor
Kenneth W. Padgitt

By Richard L. Kinney
Attorney

SOLID STATE CONTROL FOR HOSPITAL BED MOTORS

This is a continuation of application Ser. No. 187,725, filed Oct. 8, 1971.

FIELD OF THE INVENTION

The present invention is directed to an improvement in hospital beds of the type that are articulated by an electric motor and is especially concerned with improved controls for the motors of such beds.

BACKGROUND OF THE INVENTION

Hospital beds are conventionally articulated in one or more manners, such as canting the head portion up and down or moving the knee portion up and down. Although originally moved by hand cranks, it has become increasingly popular to accomplish this articulation by means of electric motors and linkages incorporated in the bed. These motors are commonly coupled to the available power mains for their energization. This motorizing of these beds not only saves human effort, but also allows the patient to control his bed's position directly from the bed, for example by means of a hand control unit, and lessens or eliminates the need for a nurse or other attendant to perform the task.

However, the coupling of electrical power to the hospital bed has introduced a new hazard - that of electrical shock and leakage currents.

A hospital patient is often more susceptible to electrical shock than the average individual. Not only is he in a weakened condition, but often he is attached to some sort of conductor. An intravenous bottle usually contains a fluid that is an electrolyte. Sometimes conductive catheters are inserted directly into the heart. In addition, various skin electrodes often are attached for test purposes.

Under any of these conditions, a slight leakage current can cause ventricular fibrillation (irregular contractions of the ventricles). The result can be heart failure. It has been estimated that 1,200 patients are killed by accidental electrocution each year.

The present invention is directed toward lowering or eliminating the danger to the patient of electric shock and leakage currents from the electric motor's control circuitry.

SUMMARY OF THE INVENTION

A control constructed in accordance with the present invention comprises a solid state power handling switch (such as a Triac) in series with the main power supply and the motor coils, circuit means for controlling the operation of that power handling switch which circuit means includes photosensitive elemnts (such as a photocell or photoresistor), and manually operational means (such as a switch in series with low voltage source and light bulb or a mechanically operated mask) for causing and removing light to fall on the photosensitive element to thereby govern the operation of the circuit means and for electrically isolating the manually operational means from the power handling circuit.

BRIEF DESCRIPTION OF THE DRAWINGS

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements, and in which:

FIG. 1A is an enlarged perspective view of a portion, the patient's hand control unit, of the bed of FIG. 1;

FIG. 3 is a circuit diagram of a modification of the control of FIG. 2; and

FIG. 4 is a sectional elevational view of another alternative embodiment of the invention.

GENERAL DESCRIPTION

Figure 1:
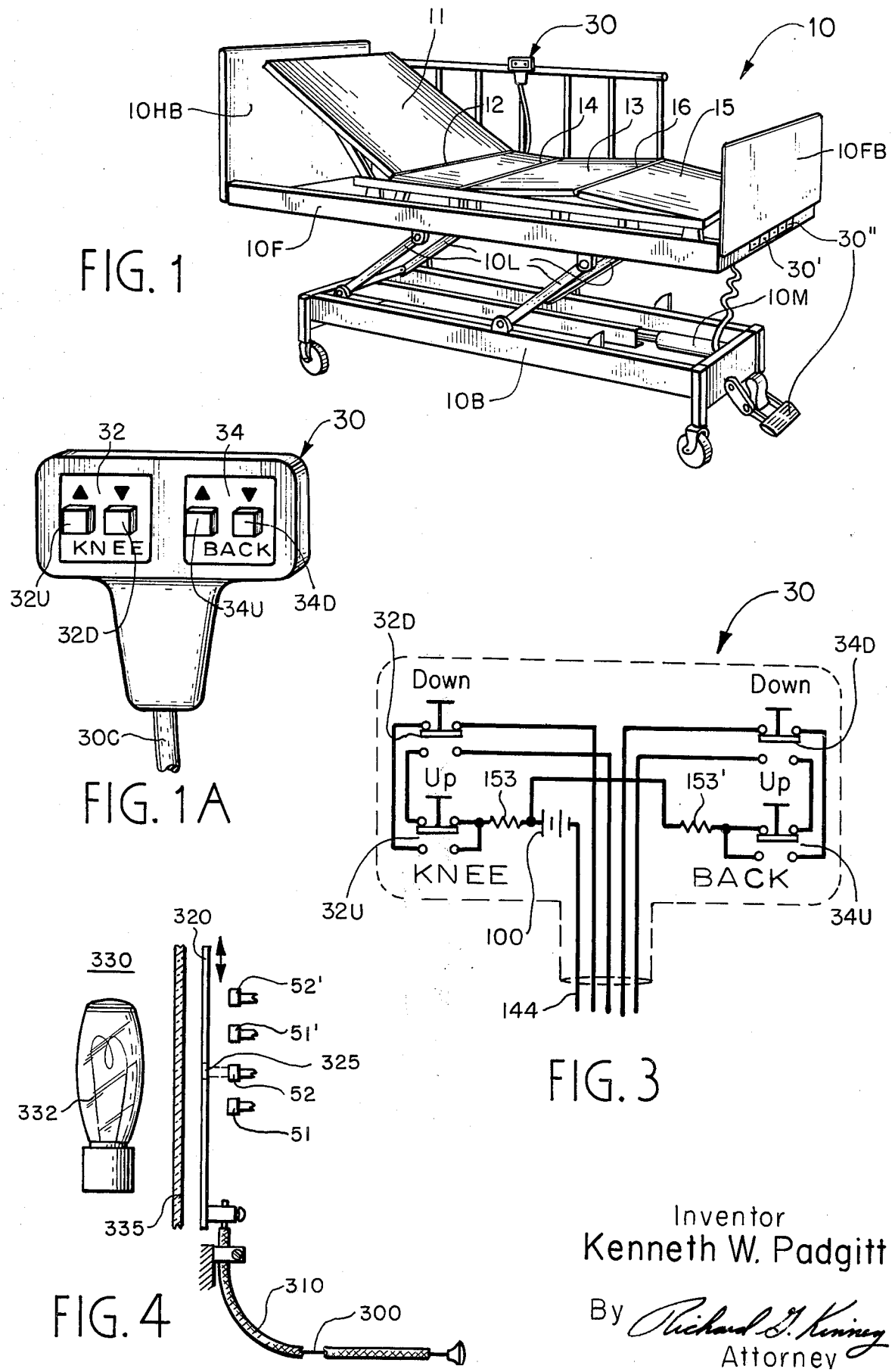
FIG. 1 is a perspective view of a hospital bed in which the present invention is employed.

In FIG. 1, the hospital bed, generally 10, is articulated by linkages driven by electric motors which may be controlled from a patient's hand unit, generally 30, which is shown in more detail in FIG. 1A. This unit may include, as shown, two sets of control pushbutton switches 32, 34 for raising and lowering the back and the knee portions of the bed 10.

Figure 2:
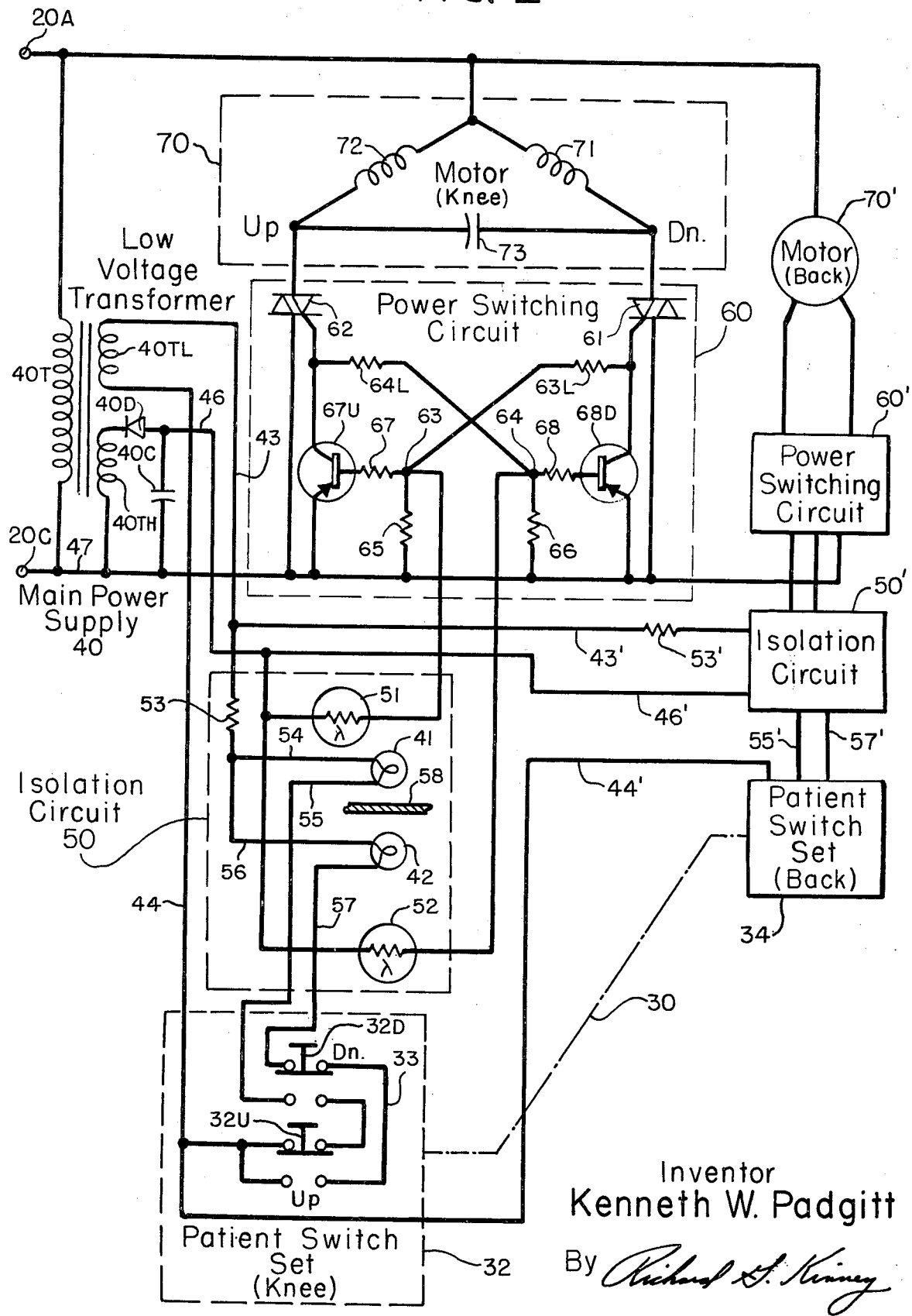
FIG. 2 is a circuit diagram, partly in block form, of the control and motor system for the bed of FIG. 1.

In accordance with the present invention, as better shown in FIG. 2, these switches 32 are connected in a low voltage circuit to an isolation circuit 50, to light or not light one or the other of a pair of lamp bulbs 41, 42 of that circuit 50 which lamps are respectively optically coupled to photosensitive elements (photoresistors) 51, 52. The elements 51, 52 are connected to a power switching circuit 60 whose power handling switches (Triacs) 61, 62 are in series with the power mains and the directional coils 71, 72 of a motor 70 to control them.

A similar isolation circuit 50' and power switching circuit 60' are coupled to the "back" patient switch set 34 to control the "back" motor 70'.

By depressing one or the other of the pushbuttons of set 32 one or the other of the lamps 41, 42 is lighted to cause the Triac 61 or 62 to connect power to one or the other of the coils 71, 72 and raise or lower the knee panel of the bed 10.

The provision of the optical coupling of circuit 50 effectively isolates the patient from the main power circuit and reduces or eliminates the possibilities of shock or leakage current therefrom. The solid-state circuitry 60 eliminates power relays and the danger of a spark starting a fire in an oxygen atmosphere. With the solid-state control, the circuitry is intrinsically safe. Intrinsically safe is defined in this application as having insufficient energy to ignite surgical cotton in an oxygen atmosphere.

The circuit 60 is tri-stable, it includes means for preventing the turning on of both triacs at the same time and also allows neither to be energized when desired. Power is connected to coil 71 through capacitor 73 when coil 72 is directly energized and vice versa.

DETAILED DESCRIPTION

Referring again to FIG. 1, the bed 10, in more detail, includes a base 10B to which a bed lift frame 10F is attached by linkage 10L. The frame 10F has the conventional headboard 10HB and footboard 10FB attached to it.

The frame 10F supports a number of movable panels upon which a matress (not shown) is placed. These include a back panel 11 hinged to pivot along 12, a knee panel 13 hinged to pivot along 14 and a foot panel 15 hinged to the knee panel 13 at 16.

The linkages for moving these panels and the motors 70, 70' of FIG. 2 are hidden from view in FIG. 1 under the panels but, as is the conventional practice these are mounted at and about the plane of the frame 10F. In addition to the control unit 30, a second unit 30' may be provided at the foot of the bed for operation by an attendant, and additional controls 30" also at the foot may be provided for, for example, raising and lowering the frame 10F by energizing the motor 10M and for cutting off the patient's unit 30.

The hand unit 30, as shown in FIG. 1A, includes a pair of pushbuttons 32U and 32D for respectively raising up and lowering down the knee panel and a simple pair of pushbuttons 34U and 34D for similarly raising and lowering the back panel 11. The unit 30 is connected to the control circuitry 50 and 60 (FIG. 2) by means of an insulated cable 30C.

The circuit arrangement for the pushbuttons 32 is shown in detail in FIG. 2, it being understood that those for the pushbuttons 34 (and any additional articulation controls desired) are similar.

The pushbutton switch 32U and 32D are shown in their normal or undepressed states (to which they are mechanically biased). It should be noted that each switch is in series with the NC (normally closed) contacts of the other so that if both are depressed neither bulb 41 or bulb 42 is energized.

In the circuit of FIG. 2 a low voltage supply for the unit 30 is derived from a transformer 40T which is part of a power supply generally designated 40. The transformer 40T has its primary coil connected across the a.c. mains 20A, 20C and includes two electrically separated secondary coils 40TL and 40TH which produce respectively lower and higher voltage a.c. outputs. The secondary 40TL has one side connected via line 43, an isolation resistor 53 and line 54 to one side of the lamp 41. The other side of the lamp 41 is connected via line 55 to one of the NO (normally open) contacts of the switch 32D. The other NO contact of this switch is connected to one NC contact of the switch 32U, whose other NC contact is connected via a line 44 to the other end of the low voltage coil 40TL. Thus pushing the switch 32D, with the switch 32U left unpushed, closes the circuit from the coil 40TL through the lamp 41 and lights that lamp.

A similar circuit from coil 40TL, through line 43, resistor 53, a line 56, through bulb 42, a line 57, the NC contacts and switch block of switch 32D, a line 33, the NO contacts of switch 32U and the line 44, allows the lamp 42 to be energized from the secondary 40TL when the pushbutton switch 32U is pushed to bridge its NO contacts while the switch 32D remains in its normal state bridging its NC contacts.

The lamps 41, 42 are, of course, light isolated from the opposite lamp's photoresistor 52, 51 as indicated by the wall segment 58.

The power switching circuit includes, in accordance with a feature of the present invention, additional means to prevent the energization of both the Up coil 72 and Down coil 71 of the motor 70.

The secondary coil 40TH serves as part of a d.c. power supply which includes a diode 40D and a capacitor 40C which serves to develop a negative voltage on a line 46 relative to a reference potential line 47. This supply voltage is fed from lines 46 to one side of each of the elements 51, 52. The other side of these elements 51 and 52 are respectively connected to electrical points 63, 64 of the power switching circuit 60. The point 63 is connected through resistor 65 to line 47, and through a resistor 67 to the base of a PNP transistor 67U. Similarly, the point 64 is connected through a resistor 66 to line 47, through a resistor 68 to the base of a PNP transistor 68D and through a resistor 64L to the collector of the transistor 67U whose emitter is connected to line 47. Similarly, the collector of the transistor 68D is connected through a resistor 63L to point 63.

The collectors of the transistors 67U and 68D are respectively also connected to the control electrodes of the Triacs 62 and 61. The main terminal 1 and the main terminal 2 of the Triac 61 are connected to the reference line 47 and to one side of the coil 71 of motor 70 while the main terminals 1 and 2 of the Triac 62 are similarly connected to line 47 and the one side of coil 72 of the motor.

The other ends of the coils 71 and 72 are connected together to the a.c. mains input 20A and a capacitor 73 is connected between the Triac connected ends of the coils 71, 72.

OPERATION

In operation, the pushing of one of the switches 32D (or 32U), without operating the other, serves to light the lamp 41 (or 42). This causes the light to fall on the photoresistor 51 (or 52) causing its resistance to drop. This fall in resistance in the voltage divider formed by resistor 51 and 65 (or 52 and 66) is reflected in a more negative potential at point 63 (or 64). This voltage is also communicated through the resistor 63L (or 64L) to drive the gate of the Triac 61 (or 62) negative and cause it to conduct.

The drop in potential at point 63 (or 64) is coupled to the base of the transistor 67U (68U) through the resistor 67 (68) to turn on that transistor. This effectively shorts the gate of Triac 62 (61) to its main terminal 1 and thus prevents its turning on.

Release of the pushbutton interrupts the circuit to the bulb and reverses the operation to de-energize the motor coil and stop the movement of the panel.

The operation of the additional controls and motor system such as that of the switch set 34, isolation circuit 50', power switching circuit 60' and motor 70', shown in FIG. 2, may be identical with the low voltage supply being connected thereto via the line 44' and the line 43' and isolation resistor 53', while the d.c. power supply is connected thereto over the line 46'.

In FIG. 3 a modification of the embodiment of FIGS. 1 and 2 is depicted in which the low voltage or step down transformer including the coil 40TL are eliminated and replaced by a battery 100 which may be a simple pen-lite battery. In this embodiment current limiting resistors 153, 153', similar to the resistors 53, 53' are connected between the battery 100 in the hand unit 30 rather than at the bulbs in the circuit 50. In this case the fifth line 144 (similar to the fifth line 44 of FIG. 2) need only be connected to the lines 54 and 56. Otherwise the circuit of FIG. 2 is unchanged and its operation would be substantially the same as described above.

Referring to FIG. 4, another alternative modification of the embodiment of FIGS. 1-2 is there depicted. In this case the hand unit 30 is entirely mechanical, having no electrical components at all and consists of a push-pull arrangement of flexible cable 300 contained in a flexible sleeve 310 that moves a mask 320 having a single apparatus 325 for allowing light from a source 330 to fall on one or none of the photoresistors 51, 52, 51', 52' of the circuits 60, 60'. In this case the light source may be constantly on during use and may consist of a low power bulb 332 and diffuser 335 or any suitable equivalent such as a fluorescent tube light or line filament bulb. The operation of the isolation circuit and the power switching circuit would be substantially unchanged from the above. The patient would, in this case, move the cable to achieve whichever one movement be desired.

For completeness in the disclosure but not for purposes of limitation the following representative values and component identifications are submitted. These values and components were employed in a system that was constructed in accordance with FIGS. 1 and 2 and tested and which provided high quality performance. Those skilled in this art will recognize that many alternative elements and values may be employed in constructing systems and circuits in accordance with the present invention. Indeed, even though the herein set out system and circuit are the presently considered best mode of practicing the invention, the present inventor may himself decide after further experiments and experience, or for differing environments of use, to make modifications and changes from these values.

| Component | Type or Value |
| --- | --- |
| 40TL | 24v a.c. Secondary Winding |
| 40TH | 12v a.c. Secondary Winding |
| 40D | 1N4001 |
| 40C | 100 μF |
| 41 | 16ESB Indicator Lamp |
| 42 | 16ESB Indicator Lamp |
| 51 | CL5P4L Photocell |
| 52 | CL5P4L Photocell |
| 61 | 40 430 Triac |
| 62 | 40 430 Triac |
| 65, 66 | 1.5K ½W Comp. Resistor |
| 67, 68 | 1K ½W Comp. Resistor |
| 63L, 64L | 270r ½W Comp. Resistor |
| 67U, 68D | MPS 65 18 |
| 71, 72 | Permanent Split Capacitor Induction Motor |

While efforts have been made to accurately record and transcribe these values it is, of course, possible that one or more errors may have inadvertently crept into this compilation. To guard against these, the reader is cautioned to employ the well-known methods to verify the above.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true contribution and scope of the invention.

What is claimed is:

1. In an adjustable motorized hospital bed of the type having articulated panels positioned by at least one reversible electric motor having forward and reverse winding coils, a solid state control system for controlling the application of a relatively high voltage a.c. mains to the winding coils to effect rotation of the motor in either clockwise or counterclockwise direction, comprising:

first and second triacs each having first and second main terminals and a gate terminal;

a first series circuit, including the forward winding coil and the first and second main terminals of said first triac, coupled across the a.c. mains;

a second series circuit, including the reverse winding coil and the first and second main terminals of said second triac, coupled across the a.c. mains;

a first voltage divider, including a first photosensitive element, coupled to the gate terminal of said first triac and normally applying to that gate terminal a voltage of an amplitude insufficient to turn said first triac ON and render it conductive;

a second voltage divider, including a second photosensitive element, coupled to the gate terminal of said second triac and normally applying to that gate terminal a voltage of an amplitude insufficient to turn said second triac ON and render it conductive;

first and second light emitters each of which is optically coupled to, but electrically isolated from, a respective one of said first and second photosensitive elements;

a source of relatively low voltage;

a hand-held, patient operated control unit having first and second manually actuated switches each of which, when actuated, couples said low voltage source to a respective one of said light emitters to effect illumination thereof, the resistance of said first photosensitive element decreasing in response to the illumination of said first light emitter to effect an increase in the voltage applied to the gate terminal of said first triac thereby turning the first triac ON and coupling the high voltage a.c. mains to the forward winding coil to cause the motor to rotate in the clockwise direction, the resistance of said second photosensitive element decreasing in response to the illumination of said second light emitter to effect an increase in the voltage applied to the gate terminal of said second triac thereby turning the second triac ON and coupling the high voltlage a.c. mains to the reverse winding coil to cause the motor to rotate in the counterclockwise direction;

means, operable when said first photosensitive element is activated by light from said first light emitter, for preventing said second triac from conducting;

and means, operable when said second photosensitive element is activated by light from said second light emitter, for preventing said first triac from conducting.

* * * * *